United States Patent
Feyh

(10) Patent No.: US 10,693,798 B2
(45) Date of Patent: Jun. 23, 2020

(54) SYSTEM ARCHITECTURE FOR VARYING RATE TRANSMISSION

(71) Applicant: AVAGO TECHNOLOGIES INTERNATIONAL SALES PTE. LIMITED

(72) Inventor: German Stefan Otto Feyh, Boulder, CO (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 460 days.

(21) Appl. No.: 14/930,240

(22) Filed: Nov. 2, 2015

(65) Prior Publication Data

US 2016/0127245 A1    May 5, 2016

Related U.S. Application Data

(60) Provisional application No. 62/074,271, filed on Nov. 3, 2014, provisional application No. 62/245,558, filed on Oct. 23, 2015.

(51) Int. Cl.
| | |
|---|---|
| *H04L 12/825* | (2013.01) |
| *H04L 12/26* | (2006.01) |
| *H04L 1/00* | (2006.01) |
| *H04L 1/20* | (2006.01) |

(52) U.S. Cl.
CPC ............ *H04L 47/25* (2013.01); *H04L 1/0002* (2013.01); *H04L 43/00* (2013.01); *H04L 1/203* (2013.01)

(58) Field of Classification Search
None
See application file for complete search history.

(56) References Cited

U.S. PATENT DOCUMENTS

| | | | |
|---|---|---|---|
| 9,130,695 B1* | 9/2015 | Dalmia | H04L 12/4013 |
| 10,148,508 B1* | 12/2018 | Sedarat | H04L 12/40 |
| 2007/0124727 A1* | 5/2007 | Tennyson | H04L 5/1446 717/158 |
| 2009/0097390 A1* | 4/2009 | Diab | H04L 12/40136 370/201 |
| 2009/0204836 A1* | 8/2009 | Diab | H04L 12/12 713/323 |
| 2010/0322105 A1* | 12/2010 | Diab | H04L 12/4625 370/254 |
| 2011/0022699 A1* | 1/2011 | Powell | G06F 1/3209 709/224 |
| 2011/0110253 A1* | 5/2011 | Ahn | H04L 45/245 370/252 |
| 2013/0070823 A1* | 3/2013 | Malkin | H04L 25/03343 375/220 |

(Continued)

*Primary Examiner* — Alpus Hsu
*Assistant Examiner* — Camquyen Thai
(74) *Attorney, Agent, or Firm* — Xsensus LLP

(57) ABSTRACT

A system receives an incoming datastream at an incoming data rate or transmits an outgoing datastream at an outgoing data rate. The system may include a detection circuit to monitor the signal quality of the datastream. Responsive to changes in the monitored signal quality, the system may switch the data rate from a first data rate to a new data rate. If signal conditions are favorable, the system may switch to a higher data rate than the first data rate. If signal quality conditions worsen, the system may switch from the first data rate to a lower data rate to allow for a reduction in error rate.

10 Claims, 4 Drawing Sheets

(56) References Cited

U.S. PATENT DOCUMENTS

| | | | |
|---|---|---|---|
| 2013/0138830 A1* | 5/2013 | Fang | H04L 47/263 709/233 |
| 2014/0092918 A1* | 4/2014 | Jost | H04J 3/0661 370/465 |
| 2014/0108840 A1* | 4/2014 | Imao | G06F 1/3278 713/323 |
| 2014/0273591 A1* | 9/2014 | Dang | H01R 13/6582 439/350 |
| 2014/0376364 A1* | 12/2014 | Franzon | G06F 11/2007 370/228 |

* cited by examiner

SYSTEM ARCHITECTURE FOR VARYING RATE TRANSMISSION

PRIORITY CLAIM

This application claims priority to provisional application Ser. No. 62/074,271, filed 3 Nov. 2014 and to provisional application Ser. No. 62/245,558, filed 23 Oct. 2015, each of which being entirely incorporated by reference.

TECHNICAL FIELD

This disclosure relates to varying connection rates for wireline connections.

BACKGROUND

High speed data networks form part of the backbone of what has become indispensable worldwide data connectivity. Within the data networks, network devices, such as synchronization devices, maintain network connection integrity among interconnected devices. Improvements in connection quality management will further enhance performance of data networks.

DETAILED DESCRIPTION

The disclosure below concerns techniques and architectures for implementing data rate adjustment in wireline networks, e.g., twisted pair networks, coaxial networks, optical networks, or other guided media. In some cases, networks may experience transient changes in signal quality resulting from varying signaling conditions. Signal levels, signal-to-noise ratio (SNR), bit error rates, symbol error rates, and/or other signal quality levels may change along with the varying signaling conditions. The architectures and techniques discussed below allow the system to adjust the data rate used in communication to increase and/or decrease the ratio of robustness to signal quality loss as the signal conditions change. For example, the system may reduce its data rate if poor signaling conditions are experienced. If the source of the poor signaling conditions is transient or if favorable signaling conditions are later present, the system may increase its data rate.

Figure 1:
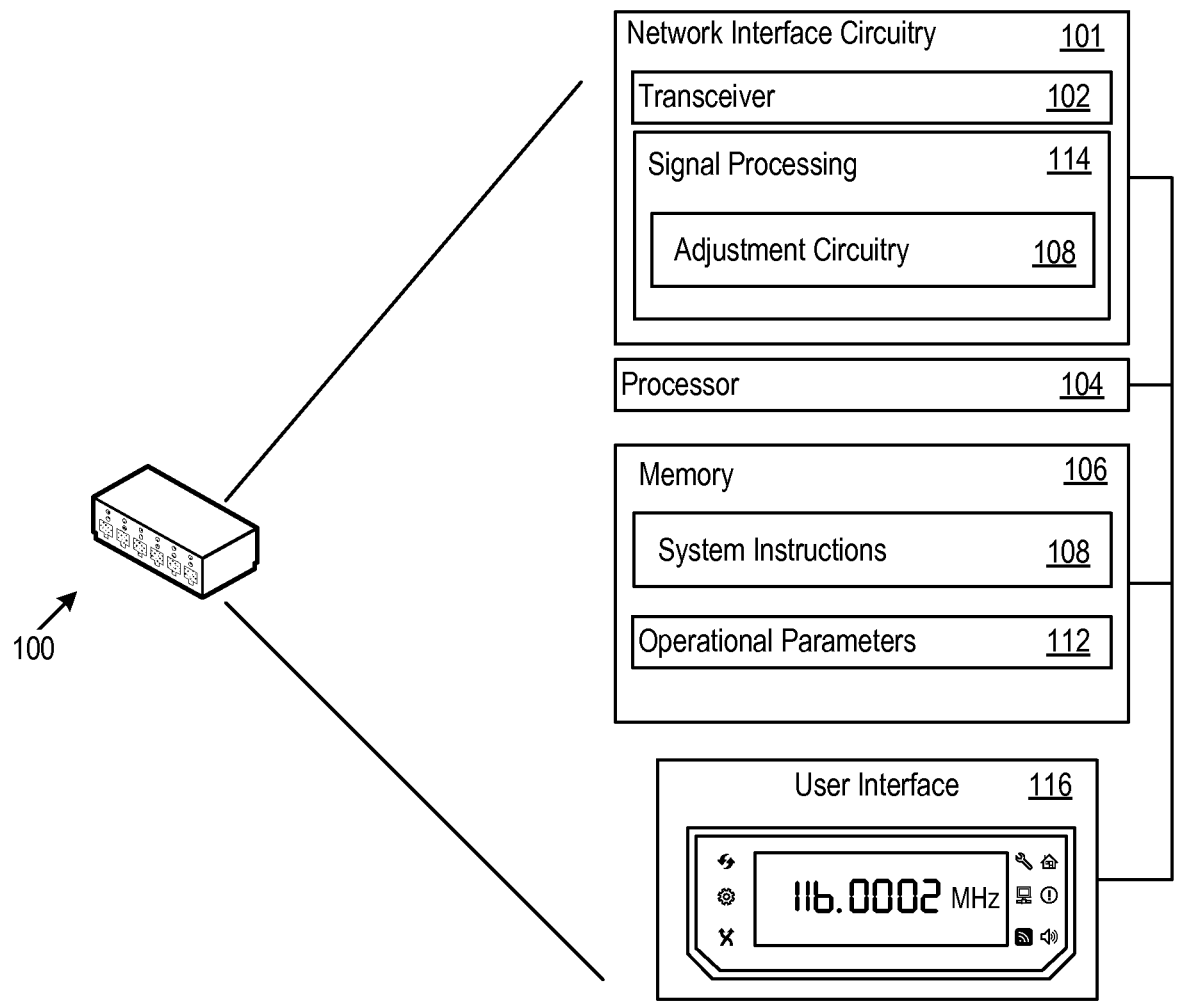
FIG. 1 shows an example device that may include connection quality management circuitry.

The example device described below provides an example context for explaining the techniques and architectures for varying data rate transmission. FIG. 1 shows an example device 100. The device 100 may be a communication device, such as a rack mount server. However, the device 100 may be virtually any device implementing data transmission. For example, a cable or satellite set-top box, a console gaming system, router, network switch, or a laptop, tablet, or personal desktop computer may use the techniques and architectures described below. The communication device may include a user interface 116 to allow for operation of the device.

The device 100 may include network interface circuitry 101, which may include transceiver 102 to support RF and/or optical communication in wireline media, e.g. wired or other wave-guided media, or free-space media. For example, the techniques and architectures may be applied to Ethernet, serial, parallel, optical, proprietary communication systems, and/or other network systems communicating over wireline media such as coaxial cable, twisted pairs, optical fibers, or other guided media. The transceiver 102 may support communications at multiple data rates. For example, the transceiver 102 may establish communication links to communication networks at one or more supported data rates. The device 100 may further include one or more processors 104 to support execution of applications and operating systems, and to govern operation of the device 100. The device 100 may include memory 106 for execution support and storage of system instructions 108 and operational parameters 112. Signal processing circuitry 114 (e.g., an Analog to Digital Converter (ADC), baseband processors or other signal processing circuits) may also be included to support transmission and reception of networking signals. The signal processing circuitry 114 may further include adjustment circuitry 108, as described below.

In some networking applications, the device 100 may implement a network protocol that supports transmission over a physical media dependent (PMD) network portion. In some cases, PMD network segments may be associated with varying error rates. For example, error rates may be dependent on cable design, cable length, temperature, physical positioning, cable defects, interference, noise shielding, and/or other physical effects on the transmission media.

In an example scenario, a category 6A (CAT 6A) cable below 100 m in length may have robust support for 10G Ethernet signaling using various protocols. However, lengths above 100 m may be supported in certain environments and not necessarily supported in other environments. In some cases, the error rate may be suitable for a first data rate when other more favorable signaling conditions are also present. Examples of signaling conditions that the protocol may analyze include transmission media temperature, radiative interference, temperature of signal generation circuitry, and/or other time-varying conditions. However, as the conditions deteriorate, the error-rate may pass into undesirable levels, for example, a level at or above an error threshold. The system may respond by adjusting the data rate to a level with desirable performance (e.g., error rate under a predetermined threshold). For example, a system operating at 10G on a CAT 6A cable above 100 m in length may switch to 5G or 2.5G operation, or other data rates, in response to a detected reduction in SNR. The system may return to 10G operation if the reduction in SNR subsides. Similarly, a system operating at 5G on a CAT 5e cable, which may lack support for a 200 Mhz transmission bandwidth, may switch to 2.5G or 1G operation, or other data rates, in response to a reduction in SNR relative to initial signaling conditions.

Some devices connect to dense sets of cables. For example, the outer casings (e.g., the insulation layers) of various cables packed together may be in physical contact with one another. Signals traveling along the cables may cause radiated and/or evanescent fields. These fields may lead to cross-talk among the cables. Cross-talk may lead to time-varying changes in transmission performance across individual cables. For example, interference levels may increase in a first cable when neighboring cables are actively carrying signals. However, when network activity on the neighboring cables ceases or decreases, the interference levels may decrease. Therefore, the first cable may support a first bit-rate at times of lower activity in neighboring cables and a second bit-rate at times of higher activity in neighboring cables, where the first bit-rate is greater than the second bit-rate.

Wireline networking may have connectivity up-times that are longer than those of wireless networks. For example, a wired Ethernet connection may remain connected for periods of a day, whereas a wireless connection may fall into an inactive state when the activity levels of the connected device fall below a certain level, e.g., entering a suspend or sleep mode. In addition, if the data rate of a wired connection is throttled down, e.g., responsive to connectivity failures, the data rate may not be ratcheted up again until the connection is brought down and subsequently renewed. This throttle down bias may occur even where the connectivity failures inciting the data rate throttle down are cause by temporary signaling condition degradations that recover shortly afterward. Over the course of an up-time, a wireline communication link may be throttled down multiple times without corresponding data rate increases when signal conditions recover. Data rate adjustment systems may address this throttle down bias by allowing for communication link data rate increases responsive to favorable signaling conditions alongside communication link throttling responsive to unfavorable signaling conditions.

Figure 2:
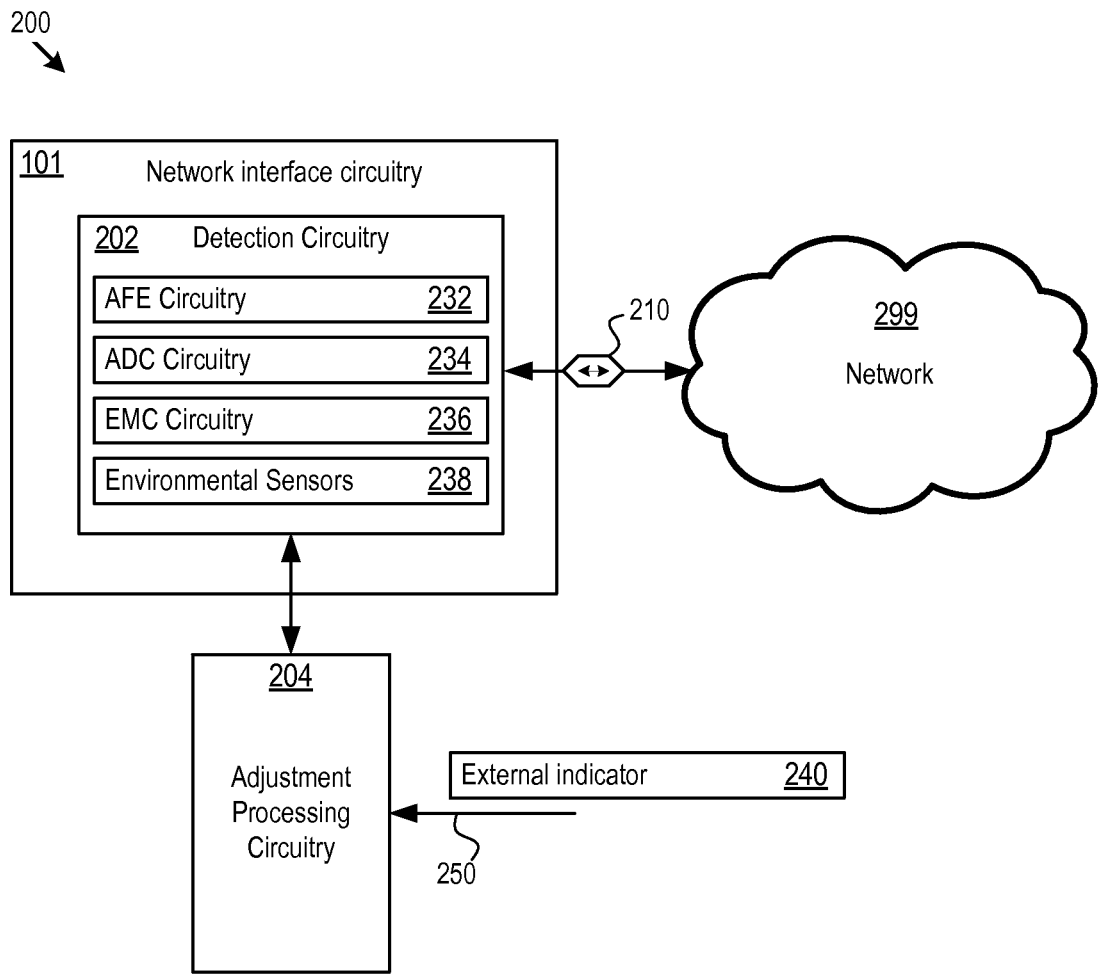
FIG. 2 shows example rate adjustment circuitry.

FIG. 2 shows example adjustment circuitry 200. The adjustment circuitry 200 may include detection circuitry 202 within network interface circuitry 101. The detection circuitry 202 may determine a signaling condition on the data line 210, which provides connectivity between the network interface circuitry and the wireline network 299.

For example, the detection circuitry 202 may determine a signal characteristic, such as an SNR, a bit-error rate, a symbol error rate, or other signal characteristic. Additionally or alternatively, the detection circuitry 202 may determine ambient conditions that may affect signal quality such as radiated emission levels, electromagnetic interference (EMI), e.g., from physical systems such as neighboring signal lines, nearby processing systems or other electronic equipment, or other EMI sources, temperature, and/or other ambient conditions.

The detection circuitry 202 may include analog frontend circuitry 232, analog-to-digital converters 234, error measurement and correction circuitry 236, environmental sensors 238, and/or other circuitry to support detection of the signal level and/or signal conditions. The detection circuitry 202 may be integrated with and/or implemented on other signal reception and transmission circuitry used to support data reception or transmission, such as network interface circuitry 101. The detection circuitry 202 may provide the detected signal level and/or signaling condition indicators to adjustment processing circuitry 204 on the signal condition output. This signal condition output may include an internal bus or network connection.

The analog frontend (AFE) circuitry 232 may include analog signal reception/transmission circuitry such as power amplifiers, modulators/demodulators, low noise amplifiers, optical amplifiers, optical modulators, photodiodes, or other circuitry to support reception/transmission of analog signals over the wireline medium.

The analog-to-digital converter (ADC) circuitry 234 may convert the received physical analog signals into digital line coded signals. The ADC circuitry 234 may be paired with digital-to-analog converter (DAG) circuitry to support conversion of line-coded digital signals to analog waveforms for transmission. The ADC circuitry may include power sensors which may be used by the detection circuitry 202 to make signal level and noise floor power measurements to determine an SNR.

The error measurement and correction (EMC) circuitry 236 may analyze received error correction frames, such as parity coding frames, forward error correction blocks, redundancy checks, concatenated coding, turbo coding frames, repeat request signals, or other error correction frames. The EMC circuitry 236 may analyze the error correction frames to determine signaling conditions, such as error rates or SNR. For example, the EMC circuitry 236 may self-compare or compare error correction frames against received data frames to determine instances of error within the signal. The EMC circuitry 236 may count the instances to determine error rate or infer a SNR based on the frequency of the instances.

The environmental sensors 238 may include temperature, vibration, voltage, current, signal power level, photodiodes, RF antennas, or other environmental sensors. The detection circuitry 202 may pull data from the environmental sensors 238 to determine environmental conditions that may affect signaling conditions.

The adjustment processing circuitry 204 may respond to the detected levels and conditions by causing the system to switch data rates. For instance, by sending a message to a communication controller, by setting a rate parameter, flag, or value in memory, or otherwise signaling or causing a switch in data rate.

The adjustment processing circuitry 204 may also receive external indicators 240, e.g., from application layers, operators, operating systems, or other sources that may specify specific data rate targets. The external indicators may be received at command input 250. Additionally or alternatively, the external indicators may be received by the adjustment processing circuitry 204 from the network 299, e.g., from infrastructure nodes, via the detection circuitry 202 and signal condition output 206.

Figure 3:
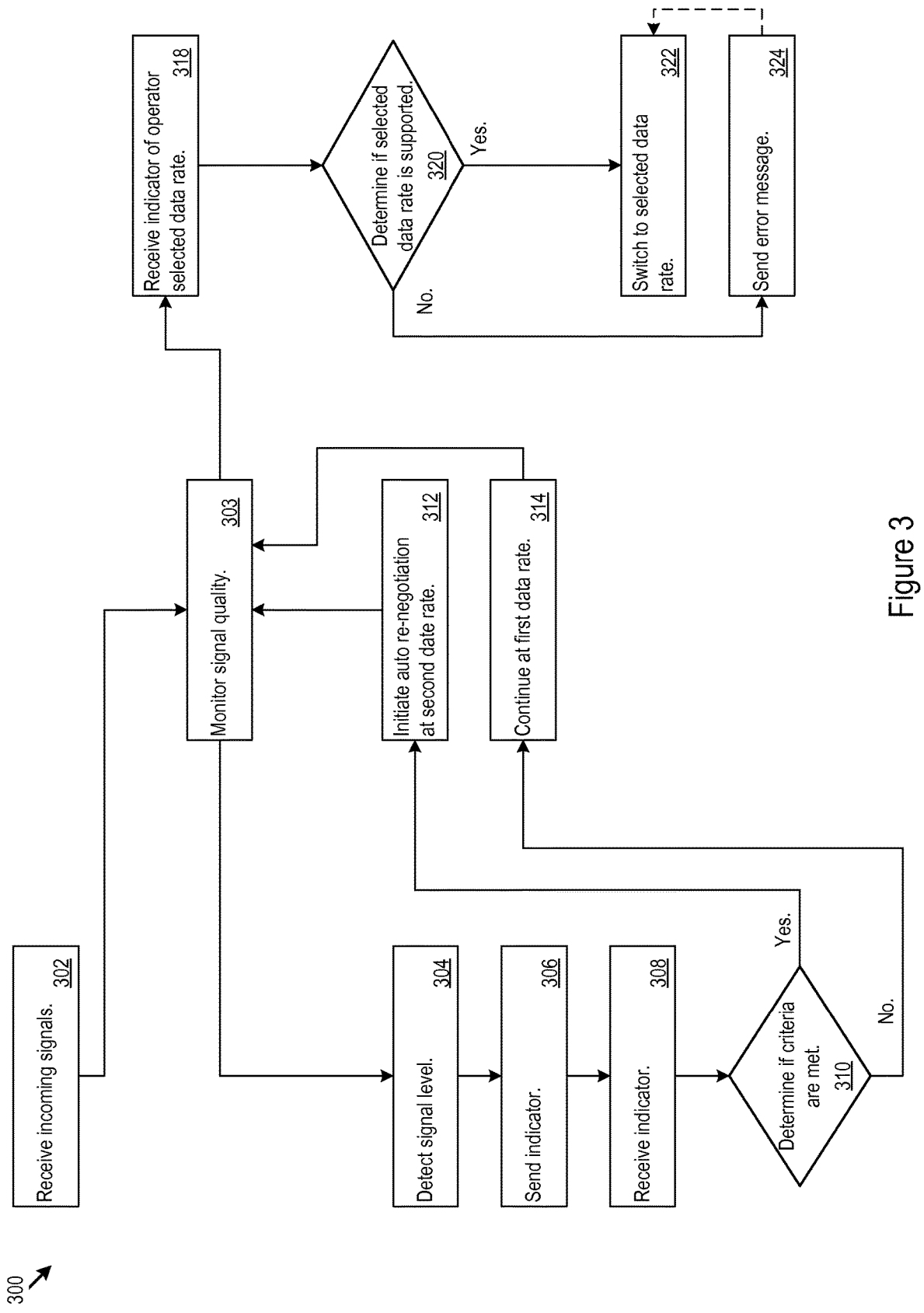
FIG. 3 shows example data rate adjustment logic, which may be implemented on the adjustment circuitry.

FIG. 3 shows example data rate adjustment logic 300, which may be implemented in the adjustment circuitry 200. The detection circuitry 202 may receive incoming signals on a data line 210 at a first data rate (302). The detection circuitry 202 may monitor the incoming signals (303). The detection circuitry 202 may detect signaling conditions for incoming signals (304). For example, the EMC circuitry 236 may determine a symbol error rate, or the ADC circuitry 234 may determine the SNR. The detection circuitry 202 may send an indicator of the detected signal level and/or detected condition to the adjustment processing circuitry 204 (306). The adjustment processing circuitry 204 receive the indicator (308). Based on the received indicator, the adjustment processing circuitry 204 may determine if one or more criteria are met for changing the data rate being used on the data line 210 (310).

For example, the adjustment processing circuitry 204 may compare the signal level and/or signaling conditions to threshold values to determine if the criteria are met. When the signal level and/or conditions exceed a threshold the adjustment processing circuitry 204 may determine to increase the data rate. When the signal level and/or conditions fall below a threshold, the adjustment processing circuitry 204 may determine to decrease the data rate. Thresholds for increasing and decreasing the data rate may be staggered to avoid repeated data rate switching near a two-way transition. However, the adjustment processing circuitry 204 may use other techniques to avoid rapid data rate changes in systems using overlapping thresholds for data rate increases and decreases.

Additionally or alternatively, the criteria may include timer back-off periods for data rate switching. For example, once the data rate is decreased, the adjustment processing circuitry may wait for a back-off timer to expire before allowing a data rate increase, e.g., the adjustment processing circuitry 204 may forgo data rate adjustments during the back-off period. A timer back-off period may also assist the adjustment processing circuitry 204 in avoiding repeated data rate changes where transient conditions may be reducing signal quality for short periods and then returning to a steady state or increasing signal quality for short periods and then returning to a steady state.

If the criteria are met, the adjustment processing circuitry 204 may switch the data rate of the system (312). For example, the adjustment processing circuitry 204 may cause an interruption of the data stream to initiate auto re-negotiation at a second data rate by sending a command to the detection circuitry 202. If the criteria are not met, the adjustment processing circuitry 204 may allow the system to continue operation at the first data rate (314). The detection circuitry 202 may continue to monitor incoming signals on the data line 210 (303).

The detection circuitry 202 may monitor signal conditions for the incoming signals by monitoring indicators within the incoming signals. For example, signal conditions may be indicated by data frames received from other network devices detailing detected conditions at those devices. Additionally or alternatively, signal condition indicators may include errors, corrupted bits/symbols, noise levels, parity coding data frames or other error correction frames, or other signal or data parameters present on incoming signals that may be used to detect failed transmission attempts. Parity coding frames may be blocks of parity bits sent to the system by other network devices. The EMC circuitry 236 within the detection circuitry 202 may compare the parity coding frame may be to other frames or self-compare the parity coding frame to determine estimates of bit-error rates symbol-error rates or other indications of failed transmission attempts. In some implementations, the parity coding frames may be received periodically or aperiodically by the detection circuitry 202. For example, parity coding frames may be received by the detection circuitry 202 at regular intervals, e.g., microsecond, millisecond, or other intervals. Additionally or alternatively, network interface circuitry 101 may add or remove parity coding frames from a data stream responsive to commands from network infrastructure nodes or client devices.

The adjustment processing circuitry 204 may receive an external indicator 240, e.g., from a system operator, of a selected data rate (318). The adjustment processing circuitry 204 may determine if the selected data rate is supported by current conditions (320). If the selected data rate is supported, the adjustment processing circuitry 204 may switch the system to the selected data rate (322). If the data rate is not supported, the adjustment processing circuitry 204 may return an error message for the system operator (324). In various implementations, the adjustment processing circuitry 204 may proceed to switch to the selected data rate or wait for further confirmation before switching.

Figure 4:
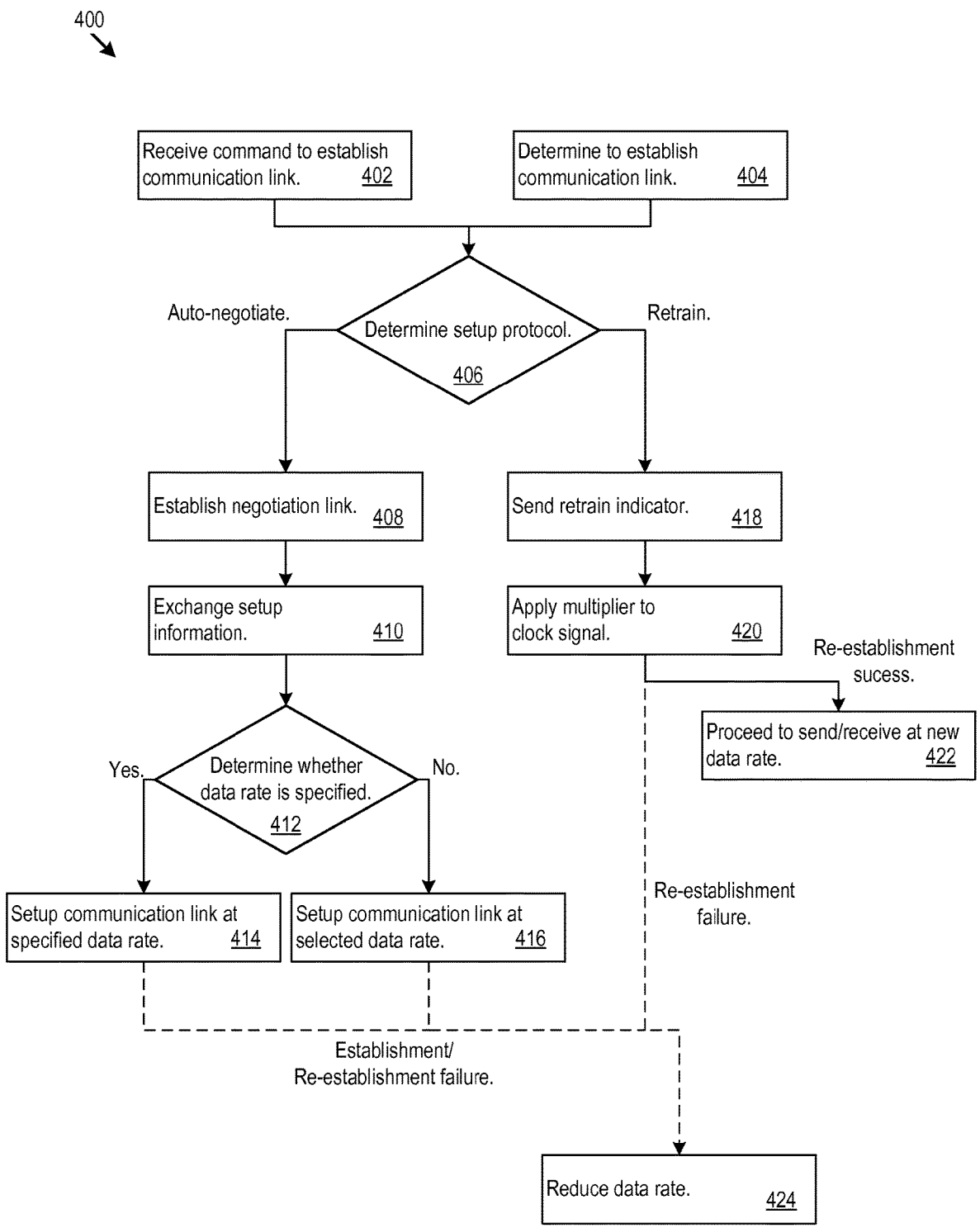
FIG. 4 shows communication link establishment logic.

Moving now to FIG. 4, communication link establishment logic 400 is shown. The network interface circuitry 101 may receive a command, e.g., from an application layer, operating system, adjustment processing circuitry, or other control circuitry, to establish a communication link to a wireline network (402). Additionally or alternatively, the network interface circuitry 101 may initially establish the communication link to the wireline network when network connectivity is detected over the wireline medium that connects the network interface circuitry 101 to the wireline network (404). The network interface circuitry 101 may determine, e.g., responsive to the command or stored instructions, the establishment protocol to be implemented during communication link establishment (406). For example, the network interface circuitry 101 may select among auto-negotiation protocols and retrain protocols, e.g., fast retrain or other retrain protocols.

If auto-negotiation is selected, the network interface circuitry 101 may establish a negotiation link using initial parameters with broad compatibility, e.g., default connection parameters (408). The network interface circuitry 101 may exchange setup information over the negotiation link, exchange timing information, pages or other data frames, which may include signal condition and device capability profiles, or other setup information (410). Once setup information is exchanged between the network interface circuitry 101 and the network, e.g., an infrastructure node or other network device, the network interface circuitry 101 may determine whether the adjustment processing circuitry 204 or an external command, e.g., from an operator or application layer, has indicated a data rate at which to establish the communication link (412). If a data rate is specified, then the network interface circuitry 101 may request to setup a communication link at the rate specified (414). If a data rate is not specified by the adjustment processing circuitry, then the network interface circuitry may select a data rate in accord with the received setup information (416). For example, the networking interface circuitry 101 may select the highest data rate for which the network interface circuitry 101 and the wireline network are compatible.

If retrain is selected, the network interface circuitry 101 may have an existing communication link to the wireline network. The network interface circuitry 101 may send a retrain indicator to the network (418) over the existing communication link. For example, the retrain indicator may include a particular bit pattern or data frame indicating a retrain and the data rate for the re-established communication link. Following the retrain indicator, the network interface circuitry 101 may apply a multiplier to the clock signal for the existing communication link (420). The multiplier may increase or decrease the clock signal frequency by the factor of the multiplier. For example, to double the data rate of the existing communication link, the network interface circuitry 101 may apply a multiplier of 2. Similarly, to halve the data rate, the network interface circuitry 101 may apply a multiplier of 0.5. Thus, the network interface circuitry 101 may apply a multiplier greater than one to increase the data rate and a multiplier less than one to decrease the data rate. After the multiplier is applied, the network interface circuitry 101 may proceed to send or receive traffic at the new data rate of the re-established communication link (422).

If establishment/re-establishment fails during retrain or auto-negotiation, the network interface circuitry may reduce the data rate of the communication link being established (424). The network interface circuitry 101 may continue to reduce the data rate until communication link establishment is successful. In some cases, a selected threshold number of failures, e.g., consecutive failures, may be met before the network interface circuitry may reduce the data rate of the communication link being established. For example, the network interface circuitry may reduce the data rate of the communication link being established after 3 consecutive failed retrains or auto-negotiations. The network interface circuitry 101 may then proceed with the establishment/re-establishment at the reduced data rate.

The methods, devices, processing, and circuitry described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete circuitry or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device, comprising:
    network interface circuitry; and
    adjustment processing circuitry configured to:
        determine a signaling condition, of a wireline medium, based on external environmental conditions surrounding the wireline medium;
        control, responsive to the signaling condition, the network interface circuitry to establish a communication link over the wireline medium at a first data rate with a network device;
        subsequent to establishing the communication link, detect a change in the signaling condition of the wireline medium;
        control, responsive to the change in the signaling condition, the network interface circuitry to re-establish the communication link at a second data rate different than the first data rate with the network device;
        determine, based on the signaling condition and responsive to the network interface circuitry receiving an indicator of a third data rate from the network device, whether the third data rate is supported by the external environmental conditions;
        control, in a case that the third data rate is supported by the external environmental conditions, the network interface circuitry to establish the communication link at the third data rate with the network device; and
        control, in a case that the third data rate is not supported by the external environmental conditions, the network interface circuitry to transmit an error message via the wireline medium to the network device, wherein
    the second data rate is greater than the first data rate in a case that the change in the signaling condition exceeds an improvement threshold level,
    the second data rate is less than the first data rate in a case that the change in the signaling condition is lower than a staggered threshold level that is lower than the improvement threshold level, and
    the network interface circuitry is configured to:
        determine a setup protocol for establishing the communication link with the network device;
        in a case that the network interface circuitry determines that the setup protocol is to auto-negotiate,
            establish a negotiation link with the network device,
            exchange setup information with the network device via the negotiation link,
            determine whether a data rate is specified in the setup information,
            setup the communication link at the specified data rate in a case that the data rate is specified, and
            setup the communication link at a selected data rate in a case that the data rate is not specified; and
        in a case that the network interface circuitry determines that the setup protocol is to retrain,
            send a retrain indicator to the network device, and
            apply a multiplier to a clock signal for the first data rate to generate a clock signal for the second data rate.

2. The device of claim 1, wherein the signaling condition comprises a signal-to-noise ratio for the communication link.

3. The device of claim 1, wherein the signaling condition comprises a bit-error rate for the communication link.

4. The device of claim 1, wherein the network interface circuitry is configured to receive a parity coding frame over the communication link.

5. The device of claim 4, wherein the network interface circuitry is configured to receive parity coding frames periodically while the communication link is active.

6. The device of claim 4, wherein the adjustment processing circuitry is configured to determine the signaling condition by analyzing the parity coding frame received by the network interface circuitry.

7. The device of claim 1, wherein the adjustment processing circuitry is configured to:
    responsive to establishing the communication link at the first data rate, start a back-off timer; and forgo controlling the network interface circuitry to re-establish the communication link responsive to a detection of another improvement in the signaling condition at a first time before an expiration of the back-off timer.

8. The device of claim 1, wherein the indicator is received via the communication link.

9. A method by a device that includes adjustment processing circuitry and network processing circuitry, the method comprising:
by the adjustment processing circuitry:
determining a signaling condition, of a wireline medium, based on external environmental conditions surrounding the wireline medium;
controlling, responsive to the signaling condition, the network interface circuitry to establish a communication link over the wireline medium at a first data rate with a network device;
subsequent to establishing the communication link, detecting a change in the signaling condition of the wireline medium;
controlling, responsive to the change in the signaling condition, the network interface circuitry to re-establish the communication link at a second data rate different than the first data rate with the network device;
determining, based on the signaling condition and responsive to the network interface circuitry receiving an indicator of a third data rate from the network device, whether the third data rate is supported by the external environmental conditions;
controlling, in a case that the third data rate is supported by the external environmental conditions, the network interface circuitry to establish the communication link at the third data rate with the network device; and
controlling, in a case that the third data rate is not supported by the external environmental conditions, the network interface circuitry to transmit an error message via the wireline medium to the network device, wherein
the second data rate is greater than the first data rate in a case that the change in the signaling condition exceeds an improvement threshold level,
the second data rate is less than the first data rate in a case that the change in the signaling condition is lower than a staggered threshold level that is lower than the improvement threshold level, and
by the network interface circuitry:
determining a setup protocol for establishing the communication link with the network device;
in a case that the network interface circuitry determines that the setup protocol is to auto-negotiate,
establishing a negotiation link with the network device,
exchanging setup information with the network device via the negotiation link,
determining whether a data rate is specified in the setup information,
setting up the communication link at the specified data rate in a case that the data rate is specified, and
setting up the communication link at a selected data rate in a case that the data rate is not specified; and
in a case that the network interface circuitry determines that the setup protocol is to retrain,
sending a retrain indicator to the network device, and
applying a multiplier to a clock signal for the first data rate to generate a clock signal for the second data rate.

10. A device, comprising:
network interface circuitry configured to:
determine a setup protocol for establishing a communication link with a network device over a wireline medium;
in a case that the network interface circuitry determines that the setup protocol is to auto-negotiate,
establish a negotiation link with the network device,
exchange setup information with the network device via the negotiation link,
determine whether a data rate is specified in the setup information,
setup the communication link at the data rate in a case that the data rate is specified, and
setup the communication link at a selected data rate in a case that the data rate is not specified; and
in a case that the network interface circuitry determines that the setup protocol is to retrain,
send a retrain indicator to the network device, and
apply a multiplier to a clock signal for the data rate of the communication link to re-establish the communication link at a new data rate; and
adjustment processing circuitry configured to:
subsequent to the network interface circuitry establishing the communication link, detect a change in a signaling condition of the wireline medium;
control, responsive to the change in the signaling condition, the network interface circuitry to re-establish the communication link at a first data rate different than the data rate with the network device;
determine, based on the signaling condition and responsive to the network interface circuitry receiving an indicator of a second data rate from the network device, whether the second data rate is supported by external environmental conditions of the wireline medium;
control, in a case that the second data rate is supported by the external environmental conditions, the network interface circuitry to establish the communication link at the second data rate with the network device; and
control, in a case that the second data rate is not supported by the external environmental conditions, the network interface circuitry to transmit an error message via the wireline medium to the network device, wherein
the first data rate is greater than the data rate in a case that the change in the signaling condition exceeds an improvement threshold level,
the first data rate is less than the data rate in a case that the change in the signaling condition is lower than a staggered threshold level that is lower than the improvement threshold level.

* * * * *